United States Patent
Sato

(10) Patent No.: US 6,580,465 B1
(45) Date of Patent: Jun. 17, 2003

(54) CLAMP VOLTAGE GENERATING CIRCUIT AND CLAMP LEVEL ADJUSTING METHOD

(75) Inventor: Koichi Sato, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/227,266

(22) Filed: Jan. 8, 1999

(30) Foreign Application Priority Data

Jan. 9, 1998 (JP) ............................................ 10-015020

(51) Int. Cl.[7] .............................................. H04N 5/186
(52) U.S. Cl. ........................ 348/689; 348/691; 348/677; 348/673; 348/257
(58) Field of Search ................................ 348/691, 689, 348/677, 673, 687, 572, 257, 255, 678, 695, 696, 697; 341/139; 358/446; H04N 5/16, 5/18

(56) References Cited

U.S. PATENT DOCUMENTS

| | | | |
|---|---|---|---|
| 5,341,218 A | * | 8/1994 | Kaneko et al. ............. 348/695 |
| 5,345,279 A | * | 9/1994 | Takaiwa et al. ............ 348/689 |
| 5,379,075 A | * | 1/1995 | Nagasawa et al. .......... 348/691 |
| 5,461,489 A | * | 10/1995 | Ohara et al. ................. 348/689 |
| 5,504,538 A | * | 4/1996 | Tsujihara et al. ........... 348/673 |
| 5,532,758 A | * | 7/1996 | Honma ........................ 348/694 |
| 5,929,900 A | * | 7/1999 | Yamanaka et al. ............ 348/65 |
| 6,002,445 A | * | 12/1999 | Urayama ..................... 348/572 |

* cited by examiner

*Primary Examiner*—John Miller
*Assistant Examiner*—Jean W. Désir
(74) *Attorney, Agent, or Firm*—Greenblum & Bernstein, P.L.C.

(57) ABSTRACT

A low pass filter smooths a voltage corresponding to a least significant bit of a digital image signal outputted from an A/D convertor, and outputs the smoothed voltage to a sample-and-hold circuit. In the sample-and-hold circuit, a sample-hold-pulse is added during an optical black period, so that a voltage of the least significant bit of only a black level is extracted and outputted to a clamp level adjusting circuit. In the clamp level adjusting circuit, when the voltage inputted from the sample-and-hold circuit is higher 0 volts, a voltage, corresponding to a standard voltage from which the inputted voltage is subtracted by a differential amplifier, is outputted to a clamp circuit, and when the inputted voltage is 0 volts, the clamp voltage is pulled up by a pull-up resistance.

6 Claims, 4 Drawing Sheets

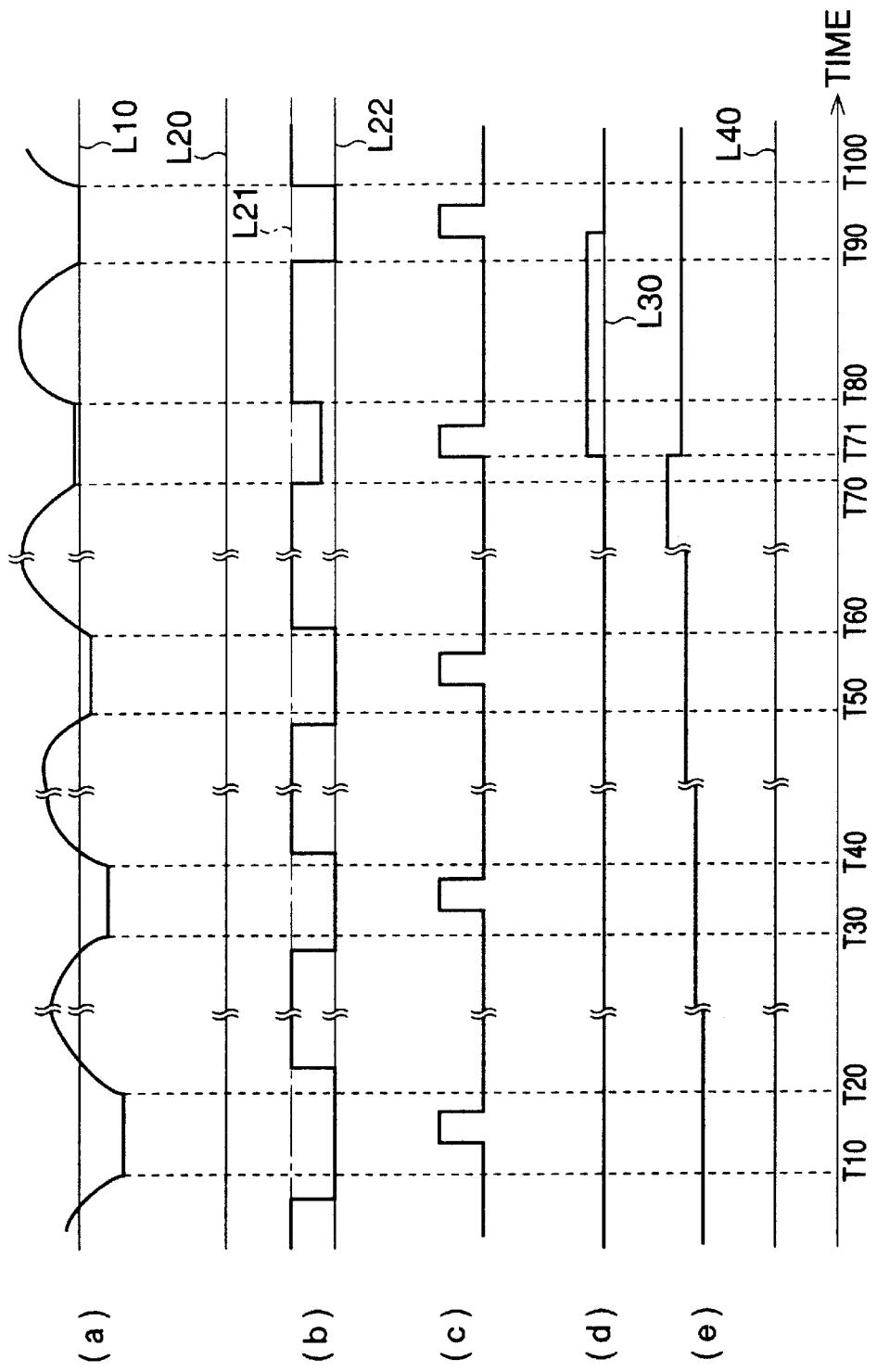

CLAMP VOLTAGE GENERATING CIRCUIT AND CLAMP LEVEL ADJUSTING METHOD

BACKGROUND OF THE INVENTION

1. Field of the Invention

The present invention relates to a clamp circuit in an image signal transferring system.

2. Description of the Related Art

Conventionally, an image photographed by a camera, such as a video camera, is photoelectrically converted by an image sensor, before being outputted as an analog image signal. The analog image signal (i.e. video signal) is subjected to an A/D conversion to enable handling by a micro computer and related circuitry provided in the camera. The analog image signal includes a direct-current component and an alternating-current component. The direct-current component indicates an average brightness of a picture. The alternating-current component indicates detail information of the picture, and fluctuates about a base line, which corresponds to the direct-current component. Since the direct-current component is lost when the analog image signal passes through an alternating-current circuit, the direct-current component should be reproduced before the analog image signal is inputted to the A/D convertor. Therefore, it is necessary that a black level is fixed, namely, the black level is clamped to a predetermined level of the A/D convertor.

The clamp level of the black level fluctuates depending on an environment in which the camera is used, for example, the clamp level is sensitive to temperature. Unless the clamp level is adjusted every time, appropriate A/D conversion is not performed. Accordingly, whether the black level is appropriately clamped is checked by detecting an output of the A/D convertor with an extra D/A convertor, and thus the clamp level can be suitably regulated at all times.

However, the extra D/A convertor, for regulating the clamp level, causes the cost of the camera to be high.

SUMMARY OF THE INVENTION

Therefore, an object of the present invention is to provide a cost-effective, simply constructed clamp voltage generating circuit.

In accordance with an aspect of the present invention, there is provided a clamp voltage generating circuit comprising: a clamp circuit to which an analog image signal is inputted, the clamp circuit clamping a signal level of the analog image signal to a predetermined level during an optical black period of the analog image signal; an A/D convertor that converts the analog image signal outputted from the clamp circuit to a digital image signal; a low pass filter that smooths a voltage corresponding to a least significant bit of the digital image signal outputted from the A/D convertor, the low pass filter outputting the smoothed voltage; a sample-and-hold circuit that holds a portion of the smoothed voltage corresponding to a black level during the optical black period, the sample-and-hold circuit outputting the black level smoothed voltage; and a clamp level adjusting circuit that outputs a clamp voltage to the clamp circuit, based on a result of comparing the black level smoothed voltage and a standard voltage corresponding to a zero level of the digital signal of the black level outputted from the A/D convertor. A signal level at which the clamp circuit clamps is determined based on the clamp voltage.

While the black level smoothed voltage of the sample-and-hold circuit is higher than 0 volts, the clamp level adjusting circuit outputs a voltage generated by subtracting the black level smoothed voltage of the sample-and-hold circuit from the standard voltage as the clamp voltage; and when the black level smoothed voltage of the sample-and-hold circuit reaches 0 volts, the clamp level adjusting circuit pulls up the clamp voltage.

The clamp level adjusting circuit has a differential amplifier, a capacitor, a first resistance and a second resistance. A negative terminal of the differential amplifier is connected to the sample-and-hold circuit. An output terminal of the differential amplifier is connected to the capacitor and one terminal of the first resistance. Another terminal of the first resistance is applied with a predetermined voltage. A positive terminal of the differential amplifier is applied with the standard voltage through the second resistance.

When the black level smoothed voltage of the sample-and-hold circuit is higher than 0 volts, the differential amplifier subtracts the black level smoothed voltage of the sample-and-hold circuit from the standard voltage. When the black level smoothed voltage of the sample-and-hold circuit is 0 volts, the first resistance pulls up the clamp voltage.

The predetermined voltage, a resistance value of the first resistance and a resistance value of the second resistance are determined such that a voltage value of the output terminal of the differential amplifier, split by the first resistance and the second resistance, is higher than the standard voltage.

When the black level smoothed voltage of the sample-and-hold circuit is higher than 0 volts, the clamp voltage continues to be pulled-up below the standard voltage until the black level smoothed voltage of the sample-and-hold circuit reaches 0 volts; and when the black level smoothed voltage of the sample-and-hold circuit is 0 volts, the clamp voltage continues to be pulled-up until the black level smoothed voltage of the sample-and-hold circuit exceeds 0 volts.

In accordance with another aspect of the present invention, there is provided a method for adjusting a clamp level, when clamping an image signal, comprising: a first step in which a voltage corresponding to a least significant bit of a black level of an A/D converted signal is smoothed; and a second step in which the clamp level of the image signal is adjusted in accordance with the smoothed voltage so that the clamp level of the black level reaches 0 level of A/D conversion.

The second step includes: determining whether the smoothed voltage corresponding to the least significant bit of the black level exceeds 0 volts; and an adjustment so that the clamp level is lowered when the smoothed voltage of the black level exceeds 0 volts, and the clamp level is pulled up when the smoothed voltage is 0 volts.

BRIEF DESCRIPTION OF THE DRAWINGS

The present invention will be better understood from the description of the preferred embodiments of the invention set forth below, together with the accompanying drawings, in which:

FIG. 4 is a graph showing output signal waves of each circuit when the black level is lower than the standard voltage.

DESCRIPTION OF THE PREFERRED EMBODIMENTS

Figure 1:
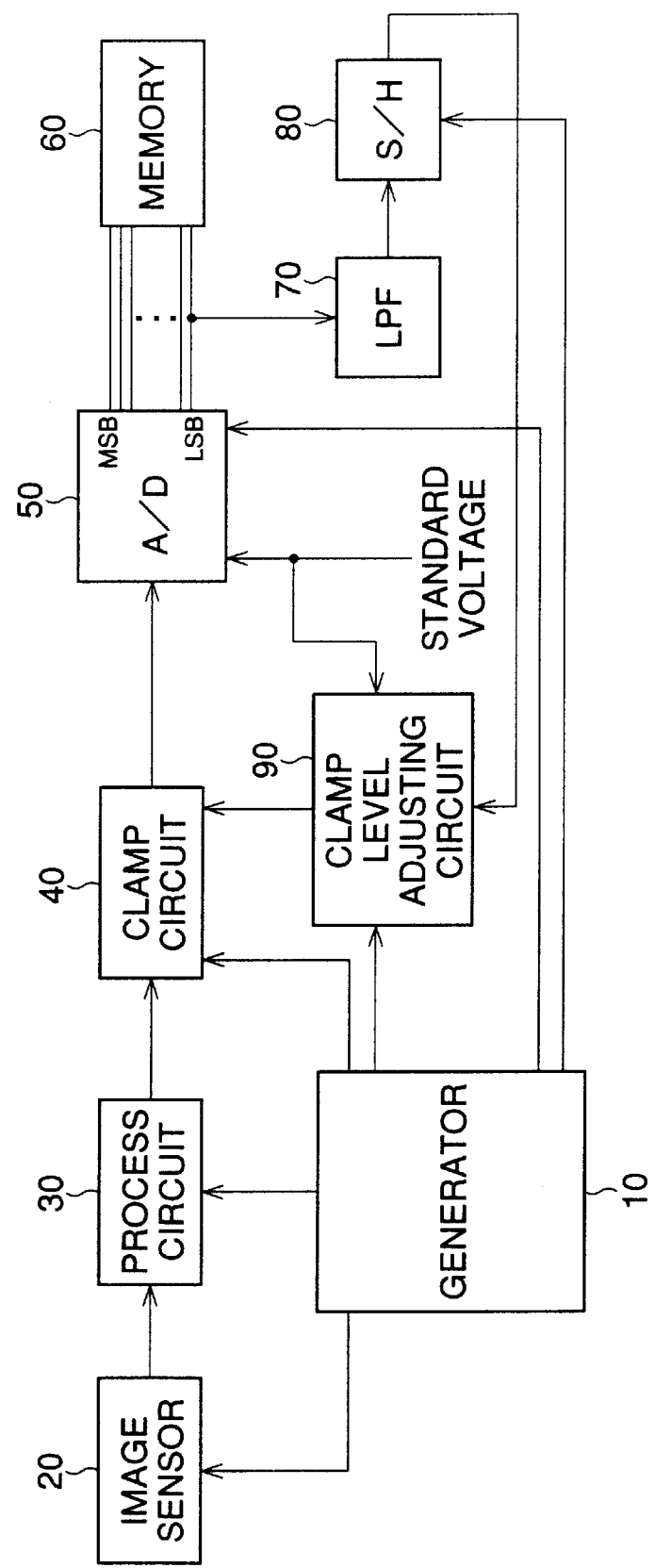
FIG. 1 is a block diagram of a clamp voltage generating circuit.

The present invention will now be described with reference to embodiments shown in the drawings. FIG. 1 is a block diagram of a clamp voltage generating circuit, to which an embodiment according to the present invention is applied. A generator 10 generates signals, such as a standard signal and timing signals, for example, S/H (sample hold) signal, clamp pulse signal or clock signal, to supply such signals to each circuit of the clamp voltage generating circuit. Each circuit of the clamp voltage generating circuit is respectively operated based on the signals supplied by the generator 10. An image signal, photoelectrically converted, is read out from an image sensor 20 and inputted to a process circuit 30, in accordance with a control of the generator 10. The image signal is subjected to predetermined operations, such as a level shifting and a sampling, in the process circuit 30, before being inputted to a clamp circuit 40. In the clamp circuit 40, the image signal is clamped. Namely, a predetermined portion of the image signal inputted to the clamp circuit 40, i.e. a signal level corresponding to an optical black period, is periodically clamped to a predetermined value. Accordingly, the clamp level of the image signal, inputted to an A/D convertor 50, is maintained at a fixed level. In the A/D convertor 50, the image signal is converted to a digital image signal. The digital image signal is then temporarily stored in an image memory 60.

A voltage signal, which changes in accordance with information, namely "H" (high) or "L" (low), of a Least Significant Bit (hereinafter an "LSB") of the digital image signal, is inputted to a Low Pass Filter (LPF) 70. Note that this voltage signal is referred to as an "LSB voltage" in this specification. In the LPF 70, the LSB voltage is smoothed and outputted to a sample-and-hold circuit (S/H) 80. In the sample-and-hold circuit 80, a sample-and-hold pulse is added only at the optical black period, and the LSB voltage of the black level is extracted and outputted to a clamp level adjusting circuit 90. In the clamp level adjusting circuit 90, a clamp voltage, which is outputted to the clamp circuit 40, is adjusted in accordance with the level of the LSB voltage of the black level. The A/D convertor 50 and the clamp level adjusting circuit 90 are supplied with a voltage corresponding to a zero level of the output of the A/D convertor 50. Note that this voltage is referred to as a "standard voltage" in this specification.

Figure 2:
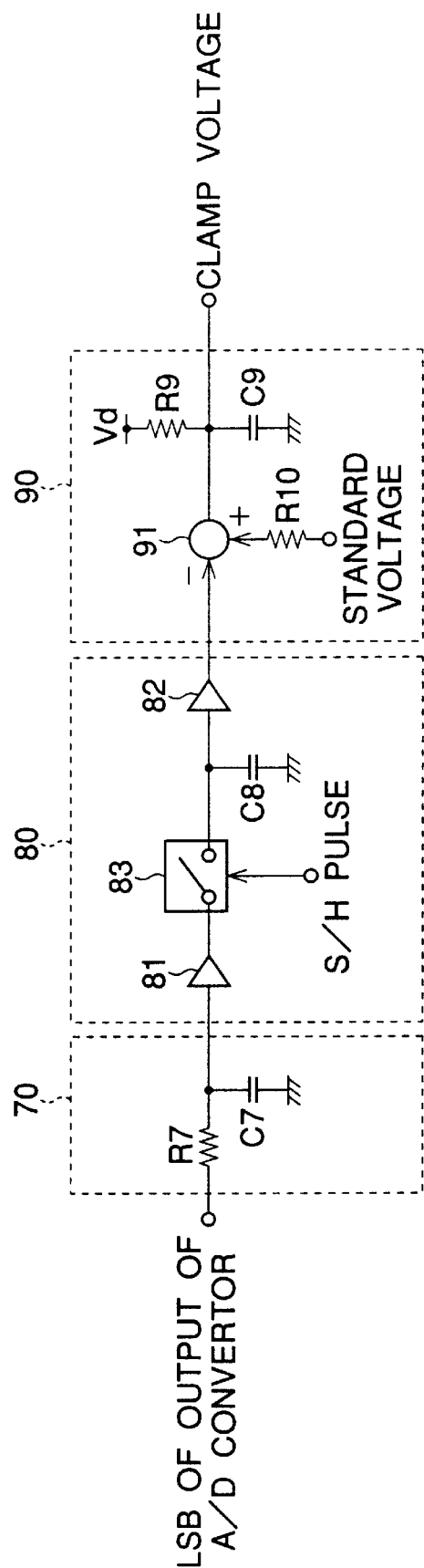
FIG. 2 is a block diagram showing the principal part of the clamp voltage generating circuit.

FIG. 2 is a block diagram showing the principal part of the clamp voltage generating circuit of this embodiment. The LPF 70 comprises a resistance R7 and a capacitor C7. The LSB voltage of the digital image signal, which is outputted from the A/D convertor 50 (see FIG. 1), is inputted to the LPF 70. The value of the LSB voltage is susceptible to noise caused by the environment in which the camera is used, and is more easily changed than the other bits of the digital image signal. Therefore, the LSB voltage includes an alternating-current component. In the LPF 70, the alternating-current component is removed, so that the LSB voltage is smoothed.

The LSB voltage, smoothed in the LPF 70, is inputted to the sample-and-hold circuit 80. The sample-and-hold circuit 80 comprises amplifiers 81, 82, a switch 83 and a capacitor C8. The LSB voltage is amplified by the amplifier 81 before being inputted to the switch 83. During the optical black period, the sample-and-hold pulse is provided to the switch 83 in accordance with the timing signal outputted from the generator 10 (see FIG. 1), so that the switch 83 becomes ON. When the switch 83 is turned ON, an electric charge, corresponding to the LSB voltage, accumulates in the capacitor C8. When the sample-hold-pulse is stopped, the switch 83 becomes OFF and the LSB voltage is applied to the clamp level adjusting circuit 90 through the amplifier 82, in accordance with the electric charge accumulated in the capacitor C8. As described above, the digital signal, which is outputted from the A/D convertor 50 (see FIG. 1) during the optical black period, i.e. the black level LSB voltage, is extracted and outputted to the clamp level adjusting circuit 90.

The clamp level adjusting circuit 90 comprises a differential amplifier 91, a resistance R9 (the first resistance), a capacitor C9 and a resistance R10 (the second resistance). A positive terminal (a non inverted input terminal) of the differential amplifier 91 is supplied with the standard voltage through the resistance R10, and a negative terminal (an inverted input terminal) of the differential amplifier 91 is connected to the output terminal of the amplifier 82. One terminal of the resistance R9 is applied with a voltage Vd. The resistance R9 has a function of a pull-up resistance.

If the voltage outputted from the amplifier 82, i.e. the smoothed black level LSB voltage, is higher than 0 volts, a voltage, corresponding to the standard voltage from which the LSB voltage has been subtracted in the differential amplifier 91, is outputted as the clamp voltage from the clamp level adjusting circuit 90 to the clamp circuit 40 (see FIG. 1).

Further, the clamp level adjusting circuit 90 is constructed in such a manner that the connection point voltage (the clamp voltage) between the pull-up resistance R9 and the capacitor C9 is pulled up when the voltage outputted from the amplifier 82 is 0 volts. Namely, the capacitor C9 is charged by the pull-up resistance R9, so that the connection point voltage is pulled-up in accordance with a rise in the charge of the capacitor C9. Further, the capacitor C9 inhibits a sudden rise in the clamp voltage, whereby a rise of the clamp voltage is stabilized. Accordingly, even if the state, in which the value of the LSB voltage is 0 volts, is maintained, the clamp voltage is continuously pulled-up, so that the clamp voltage is controlled at all times by a feedback control.

Note that the resistance R10 also has a function of a split resistance, operating with the pull-up resistance R9, by which the voltage value of the output terminal of the clamp level adjusting circuit 90 is set higher than the standard voltage. Accordingly, the voltage Vd applied to the pull-up resistance R9, and resistance values of the pull-up resistance R9 and the resistance R10 are set, whereby a maximum value of the connection point voltage split by the pull-up resistance R9 and the resistance R10 is higher than the standard voltage after being split by the pull-up resistance R9 and the resistance R10.

Figure 3:
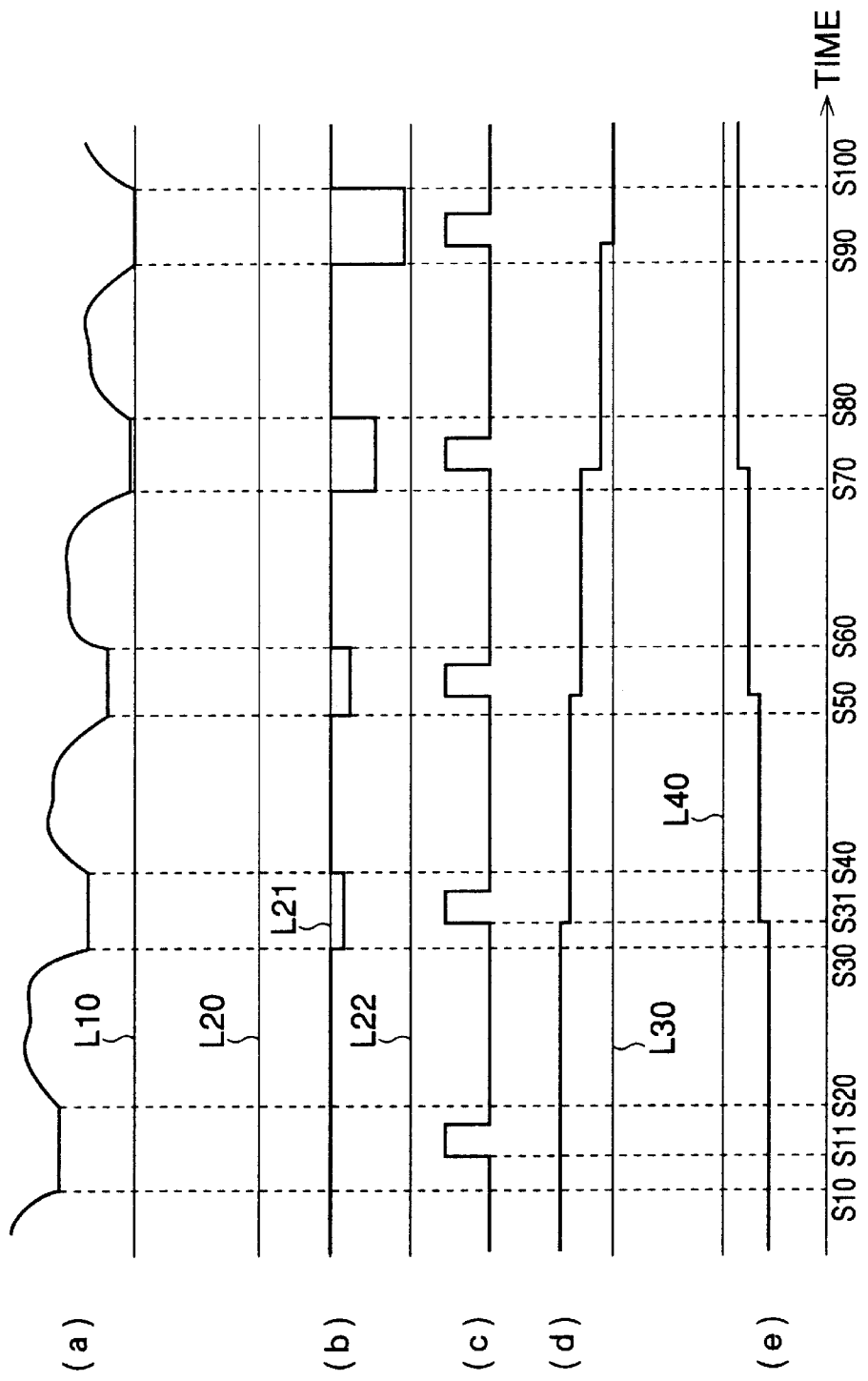
FIG. 3 is a graph showing output signal waves of each circuit of the clamp voltage generating circuit when the black level is higher than a standard voltage.

The operation of this embodiment will be explained with reference to FIGS. 3 and 4. FIG. 3 shows output signal waves of each circuit when the black level is higher than the standard voltage. Wave (a) indicates an image signal outputted from the clamp circuit 40, i.e. the clamped image signal. Line L10 corresponds to the standard voltage.

Wave (b) indicates the LSB voltage after passing through the LPF 70, i.e. the smoothed LSB voltage. Line L20 is a high level voltage value corresponding to a "H" or "1" of the LSB, and line L22 is a low level voltage value corresponding to "L" or "0" of the LSB. Further, as described above, the LSB is so susceptible to noise generated by the immediate environment of the camera that a higher degree of changeability is experienced with respect to the other bits, and thus more frequent inversion occurs. Accordingly, by passing through the LPF 70, the LSB voltage is smoothed at the base line between the high level voltage and the low level voltage. Line L21 is the base line voltage.

Wave (c) indicates the sample-hold-pulse provided to the switch 83 of the sample-and-hold circuit 80. Wave (d) indicates an output voltage of the sample-and-hold circuit 80. A line L30 represents 0 volts. When the LSB voltage is low, the output voltage (Wave (d)) of the sample-and-hold circuit 80 is 0 volts. Wave (e) indicates the clamp voltage outputted from the clamp voltage adjusting circuit 90. Line L40 is the standard voltage.

In FIG. 3, periods S10 through S20, S30 through S40, S50 through S60, S70 through S80, and S90 through S100 are the optical black periods. Namely, each of the waves during these periods in Wave (a) indicates a black level. Further, periods S20 through S30, S40 through S50, S60 through S70, and S80 through S90 are one horizontal scanning period. Namely, each of the waves during such periods in Wave (a) indicates an image signal.

In Wave (a), the black level from S10 through S20 is higher than the standard voltage L10. Accordingly, the LSB voltage after passing through the LPF 70 is higher than the low level (the line L22). At S11, the sample-hold-pulse (Wave (c)) is provided to the switch 83 of the sample-and-hold circuit 80, so that the LSB voltage (Wave (b)) from S10 through S20 is inputted to the sample-and-hold circuit 80 to be subjected to the predetermined operations. As Wave (d) shows, the output voltage of the sample-and-hold circuit 80 is higher than 0 volts. Accordingly, as described above, the voltage, corresponding to the standard voltage L10 from which the output voltage (Wave (d)) of the sample-and-hold circuit 80 has been subtracted in the differential amplifier 91, is outputted from the clamp voltage adjusting circuit 90 as the clamp voltage (Wave (e)), and is fed back to the clamp circuit 40. By the feedback of the clamp voltage (Wave (e)) adjusted in the clamp voltage adjusting circuit 90, the clamp level of the clamp circuit 40 is lowered by a predetermined amount.

Then, the LSB voltage (Wave (b)) from S30 through S40 is detected at S31. Due to the adjustment of the clamp level based on the result of detection of the black level LSB voltage from S10 through S20, the difference between the output voltage (Wave (d)) of the sample-and-hold circuit 80 and the standard voltage, from S30 through S40, is reduced. However, since the output voltage (Wave (d)) of the sample-and-hold circuit 80 is still higher than 0 volts as Wave (d) shows, the clamp voltage (Wave (e)) of the clamp voltage adjusting circuit 90 is fed back to the clamp circuit 40 after the above mentioned subtracting operation is performed. Accordingly, at S31, the clamp voltage (Wave (e)) is set higher than the clamp voltage before S31, however is still below the standard voltage L40.

The above-mentioned operations are repeatedly performed until the black level reaches the standard voltage L10, as Wave (a) shows from S90 through S100. While the black level is higher than a zero level, namely, while the output voltage (Wave (d)) of the sample-and-hold circuit 80 is higher than 0 volts, the voltage corresponding to the standard voltage from which the output voltage (Wave (d)) of the sample-and-hold circuit 80 has been subtracted, continues to be fed back to the clamp circuit 40 as the clamp voltage (Wave (e)).

FIG. 4 shows output signal waves of each circuit when the black level is lower than the standard voltage. The waves of FIG. 4 carry the same respective references as those in FIG. 3. As the black level becomes lower than the standard voltage L10 from T10 through T20, the output voltage (Wave (d)) of the sample-and-hold circuit 80 is 0 volts. As described above, the voltage applied to the pull-up resistance R9 is higher than the standard voltage L40, after being split by the pull-up resistance R9 and the resistance R10. Thus, in accordance with the output voltage (Wave (d)) of the sample-and-hold circuit 80 being 0 volts from T10 through T20, the clamp voltage (Wave (e)), i.e. the connection voltage of the pull-up resistance R9 and the capacitor C9, is pulled up and fed back to the clamp circuit 40.

Similarly, the black level LSB voltage (Wave (b)), from T30 through T40 and from T50 through T60, is detected. As the output voltage (Wave (d)) of the sample-and-hold circuit 80 is 0 volts during both periods, the clamp voltage (Wave (e)) outputted from the clamp level adjusting circuit 90 continues to be pulled up gradually. Consequently, the black level reaches a higher level than the standard voltage L10 from T70 through T80, and the output voltage (Wave (d)) of the sample-and-hold circuit 80 reaches a higher level than 0 volts at T71.

After the output voltage (Wave (d)) of the sample-and-hold circuit 80 becomes higher than 0 volts, the output voltage (Wave (d)) of the sample-and-hold circuit 80 is subtracted from the standard voltage by the clamp level adjusting circuit 90, so that the clamp voltage (Wave (e)), which has continued to be pulled up until T71, is lowered by a predetermined amount at T71, as shown. After the lowered clamp voltage (Wave (e)) is fed back to the clamp circuit 40, the black level (Wave (a)) from T90 through T100 becomes lower than the level from T70 through T80, and reaches the level of the standard voltage L10.

While the output voltage (Wave (d)) of the sample-and-hold circuit 80 is higher than 0 volts, the clamp voltage (Wave (e)), generated by subtracting the output voltage (Wave (d)) of the sample-and-hold circuit 80 from the standard voltage, continues to be outputted as the clamp voltage, until the output voltage (Wave (d)) of the sample-and-hold circuit 80 reaches 0 volts. Further, while the output voltage (Wave (d)) of the sample-and-hold circuit 80 is 0 volts, it can not be determined by what amount the black level (Wave (a)) is lower than the standard voltage L10. Accordingly, the clamp voltage (Wave (e)) continues to be pulled up until the output voltage (Wave (d)) of the sample-and-hold circuit 80 becomes higher than 0 volts. When the output voltage (Wave (d)) of the sample-and-hold circuit 80 reaches a level higher than 0 volts, the voltage, generated by subtracting the output voltage (Wave (d)) of the sample-and-hold circuit 80 from the standard voltage, is outputted as the clamp voltage (Wave (e)).

As described above, according to this embodiment, an extra D/A convertor is unnecessary, since the clamp voltage is fed back to the clamp circuit based on the black level information carried by the least significant bit of the digital signal. Accordingly, the structure of the clamp circuit can be compact, enabling the cost of the camera to be reduced.

According to the present invention, an appropriate clamp level can be maintained through the simplified structure.

The present disclosure relates to subject matter contained in Japanese Patent Application No. P10-015020 (filed on Jan. 9, 1998) which is expressly incorporated herein, by reference, in its entirety.

What is claimed is:

1. A clamp voltage generating circuit, comprising:
   a clamp circuit to which an analog image signal is input, said clamp circuit clamping a signal level of said analog image signal to a predetermined level during an optical black period of said analog image signal;

an A/D convertor that converts said analog image signal output from said clamp circuit to a digital image signal;

a low pass filter that smooths a voltage that is based upon the value of a least significant bit of said digital image signal output from said A/D convertor, said low pass filter outputting said smoothed voltage;

a sample-and-hold circuit that holds a portion of said smoothed voltage, said portion corresponding to a black level during said optical black period, said sample-and-hold circuit outputting said black level smoothed voltage; and a clamp level adjusting circuit that outputs a clamp voltage to said clamp circuit, based on a result of comparing said black level smoothed voltage and a standard voltage corresponding to a zero level of said digital signal of said black level outputted from said A/D convertor, wherein a signal level at which said clamp circuit clamps is determined based on said clamp voltage;

wherein, while said black level smoothed voltage of said sample-and-hold circuit is higher than 0 volts, said clamp level adjusting circuit outputs a voltage generated by subtracting said black level smoothed voltage of said sample-and-hold circuit from said standard voltage as said clamp voltage; and wherein, when said black level smoothed voltage of said sample-and-hold circuit reaches 0 volts, said clamp level adjusting circuit pulls up said clamp voltages.

2. A clamp voltage generating circuit according to claim 1, wherein said clamp level adjusting circuit has a differential amplifier, a capacitor, a first resistance and a second resistance, a negative terminal of said differential amplifier being connected to said sample-and-hold circuit, an output terminal of said differential amplifier being connected to said capacitor and one terminal of said first resistance, another terminal of said first resistance being applied with a predetermined voltage, and a positive terminal of said differential amplifier being applied with said standard voltage through said second resistance.

3. A clamp voltage generating circuit according to claim 2, wherein, when said black level smoothed voltage of said sample-and-hold circuit is higher than 0 volts, said differential amplifier subtracts said black level smoothed voltage of said sample-and-hold circuit from said standard voltage; and when said black level smoothed voltage of said sample-and-hold circuit is 0 volts, said first resistance pulls up said clamp voltage.

4. A clamp voltage generating circuit according to claim 3, wherein said predetermined voltage, a resistance value of said first resistance and a resistance value of said second resistance are determined such that a voltage value of said output terminal of said differential amplifier, split by said first resistance and said second resistance, is higher than said standard voltage.

5. A clamp voltage generating circuit according to claim 1, wherein, when said black level smoothed voltage of said sample-and-hold circuit is higher than 0 volts, said clamp voltage continues to be pulled-up below said standard voltage until said black level smoothed voltage of said sample-and-hold circuit reaches 0 volts; and when said black level smoothed voltage of said sample-and-hold circuit is 0 volts, said clamp voltage continues to be pulled-up until said black level smoothed voltage of said sample-and-hold circuit exceeds 0 volts.

6. A method for adjusting a clamp level, when clamping an image signal, comprising: smoothing a voltage that is based upon the value of a least significant bit of a black level of an A/D converted signal; and adjusting a clamp level of said image signal in accordance with said smoothed voltage so that said clamp level of said black level reaches a zero level of A/D conversion; and wherein said adjusting includes: determining whether said smoothed voltage corresponding to said least significant bit of said black level exceeds 0 volts; and performing an adjustment so that said clamp level is lowered when said smoothed voltage of said black level exceeds 0 volts and is pulled-up when said smoothed voltage is 0 volts.

* * * * *